(12) United States Patent
Calder et al.

(10) Patent No.: US 9,188,025 B2
(45) Date of Patent: Nov. 17, 2015

(54) APPARATUS FOR FACILITATING ACCESS TO A NACELLE INTERIOR

(75) Inventors: David P. Calder, Baltimore, MD (US); Graham F. Howarth, Middletown, DE (US)

(73) Assignee: MRA Systems, Inc., Baltimore, MD (US)

( * ) Notice: Subject to any disclaimer, the term of this patent is extended or adjusted under 35 U.S.C. 154(b) by 660 days.

(21) Appl. No.: 13/524,036

(22) Filed: Jun. 15, 2012

(65) Prior Publication Data

US 2012/0280081 A1 Nov. 8, 2012

Related U.S. Application Data

(63) Continuation-in-part of application No. 12/324,429, filed on Nov. 26, 2008, now Pat. No. 8,220,738.

(51) Int. Cl.
*B64C 7/02* (2006.01)
*F01D 25/28* (2006.01)
*B64D 29/06* (2006.01)
*F02C 7/20* (2006.01)

(52) U.S. Cl.
CPC . *F01D 25/28* (2013.01); *B64C 7/02* (2013.01); *B64D 29/06* (2013.01); *F02C 7/20* (2013.01); *F05D 2230/72* (2013.01); *Y02T 50/671* (2013.01)

(58) Field of Classification Search
CPC ........................................................ B64C 7/02
USPC ...................................... 244/129.4, 129.5, 54
See application file for complete search history.

(56) References Cited

U.S. PATENT DOCUMENTS

| | | | | |
|---|---|---|---|---|
| 3,981,450 A * | 9/1976 | McCardle et al. | ....... | 239/265.31 |
| 4,005,822 A * | 2/1977 | Timms | ...................... | 239/265.31 |
| 4,047,682 A * | 9/1977 | Brownhill | ................. | 244/110 B |
| 4,825,648 A * | 5/1989 | Adamson | ..................... | 60/226.1 |
| 5,228,641 A * | 7/1993 | Remlaoui | ................. | 244/110 B |
| 5,448,884 A * | 9/1995 | Repp | .............................. | 60/223 |
| 5,609,313 A * | 3/1997 | Cole et al. | ...................... | 244/54 |
| 6,129,311 A * | 10/2000 | Welch et al. | .............. | 244/117 R |
| 6,220,546 B1 * | 4/2001 | Klamka et al. | ............. | 244/129.4 |
| 6,334,588 B1 * | 1/2002 | Porte | .......................... | 244/129.4 |
| 6,334,730 B1 * | 1/2002 | Porte | ............................. | 403/104 |
| 6,340,135 B1 * | 1/2002 | Barton | ........................ | 244/53 B |
| 6,622,963 B1 * | 9/2003 | Ahrendt et al. | ................ | 244/54 |
| 6,625,972 B1 * | 9/2003 | Sternberger | ................. | 60/226.2 |
| 6,935,097 B2 * | 8/2005 | Eschborn | ..................... | 60/226.2 |
| 6,945,031 B2 * | 9/2005 | Lair | ............................. | 60/226.1 |
| 7,334,393 B2 * | 2/2008 | Porte | .......................... | 60/226.1 |
| 2006/0145001 A1 * | 7/2006 | Smith | ....................... | 244/110 B |
| 2007/0278345 A1 * | 12/2007 | Oberle et al. | ............... | 244/53 R |
| 2008/0110153 A1 * | 5/2008 | Seda et al. | .................... | 60/226.2 |
| 2008/0112801 A1 * | 5/2008 | Moniz et al. | ................ | 415/208.1 |
| 2008/0112802 A1 * | 5/2008 | Orlando et al. | ............ | 415/208.1 |

(Continued)

*Primary Examiner* — Tien Dinh
*Assistant Examiner* — Steven Hawk
(74) *Attorney, Agent, or Firm* — General Electric Company; William S. Munnerlyn

(57) ABSTRACT

A nacelle for housing an engine includes a fan cowl sized to cover at least a first axial portion of the engine. The engine includes an inlet end, an exhaust end, and an axis extending through the engine from the inlet end through the exhaust end. The fan cowl is coupled to an engine mounting pylon via a mounting assembly including at least one power drive system. The fan cowl is movable with respect to the engine along the axis toward at least one of the inlet end and the exhaust end.

19 Claims, 11 Drawing Sheets

(56) References Cited

U.S. PATENT DOCUMENTS

| | | | |
|---|---|---|---|
| 2010/0001123 A1* | 1/2010 | Hillereau et al. | 244/54 |
| 2010/0064659 A1* | 3/2010 | Wang | 60/226.2 |
| 2015/0110613 A1* | 4/2015 | Aten | 415/182.1 |
| 2015/0110619 A1* | 4/2015 | Bulin et al. | 415/213.1 |

* cited by examiner

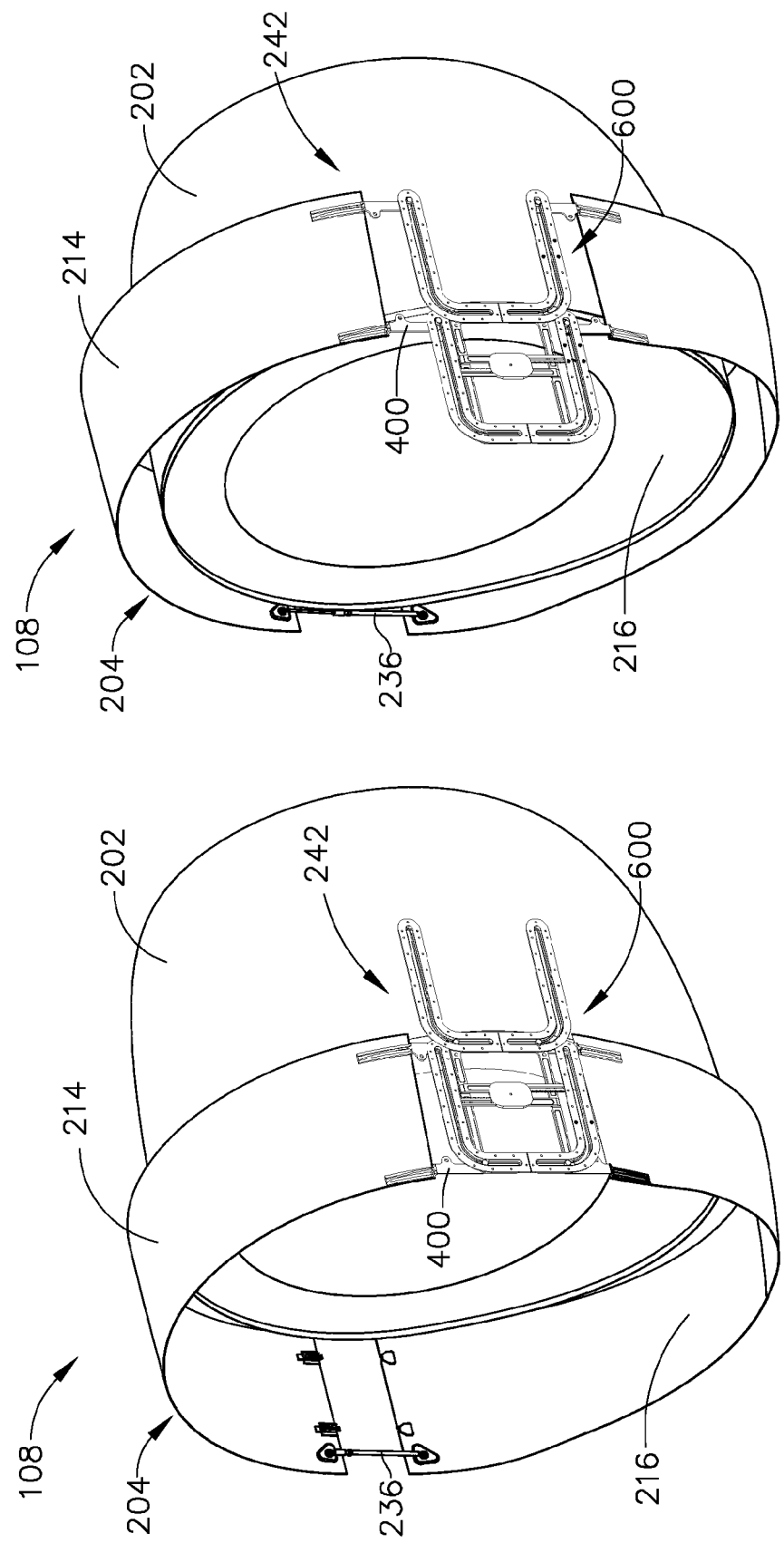

APPARATUS FOR FACILITATING ACCESS TO A NACELLE INTERIOR

CROSS REFERENCE TO RELATED APPLICATIONS

This application is a continuation-in-part of U.S. patent application Ser. No. 12/324,429, filed Nov. 26, 2008, now U.S. Pat. No. 8,220,738 entitled, "Nacelle and Method of Assembling the Same," which is incorporated by reference herein in its entirety.

BACKGROUND OF THE INVENTION

The field of this disclosure relates generally to nacelles and, more particularly, to apparatus that facilitates attaining access to an interior of a nacelle for engine access and maintenance.

Many known gas turbine engine assemblies include a nacelle that houses an engine. At least some known nacelles include a cowl that has hinged sections that can be propped open using support rods to permit engine maintenance. However, when propped open, the cowl sections may be subjected to significant wind gusts, requiring the cowl sections to be strengthened and the support rods to be sized larger in order to withstand the wind gusts when the cowl is in the open position. However, stronger cowl sections and larger hold-open components increase the overall weight of the engine assembly, thereby decreasing the fuel efficiency of the engine and increasing the costs associated with operating the engine.

As such, a nacelle that enables a cowl to remain open while reducing wind loads on the cowl would facilitate decreasing the overall weight of the cowl and associated hold-open components, thereby increasing engine efficiency by reducing fuel consumption.

BRIEF DESCRIPTION OF THE INVENTION

In one aspect, a nacelle for housing an engine is provided. The engine includes an inlet end, an exhaust end, and an axis extending through the engine from the inlet end through the exhaust end. The nacelle includes a fan cowl sized to cover at least a first axial portion of the engine. The fan cowl is coupled to an engine mounting pylon via a mounting assembly including at least one power drive system. The fan cowl is movable with respect to the engine along the axis toward at least one of the inlet end and the exhaust end.

In another aspect, a nacelle for housing an engine is provided. The engine includes an inlet end, an exhaust end, and an axis extending through the engine from the inlet end through the exhaust end. The nacelle includes a fan cowl sized to cover at least a first axial portion of the engine. The fan cowl is coupled to a mounting structure via a mounting assembly that includes a fan cowl sliding mechanism coupled to the fan cowl and a guide track coupled to the mounting structure. The fan cowl is slideable along the guide track such that the fan cowl is movable with respect to the engine along the axis toward at least one of the inlet end and the exhaust end.

BRIEF DESCRIPTION OF THE DRAWINGS

FIG. 9 is a perspective view of the fuselage-mounted engine assembly shown in FIG. 8 with the exemplary fan cowl in the open position;

FIG. 10 is a perspective view of the fuselage-mounted engine assembly shown in FIG. 9 with the fan cowl shown in FIG. 8 in the open and forward position;

DETAILED DESCRIPTION OF THE INVENTION

The following detailed description illustrates a nacelle by way of example and not by way of limitation. The description enables one of ordinary skill in the art to make and use the disclosure, and the description describes several embodiments of the disclosure, including what is presently believed to be the best mode of carrying out the disclosure. The disclosure is described herein as being applied to a preferred embodiment, namely, a nacelle. However, it is contemplated that this disclosure has general application to cowls in a broad range of systems and in a variety of industrial and/or consumer applications.

Figure 1:
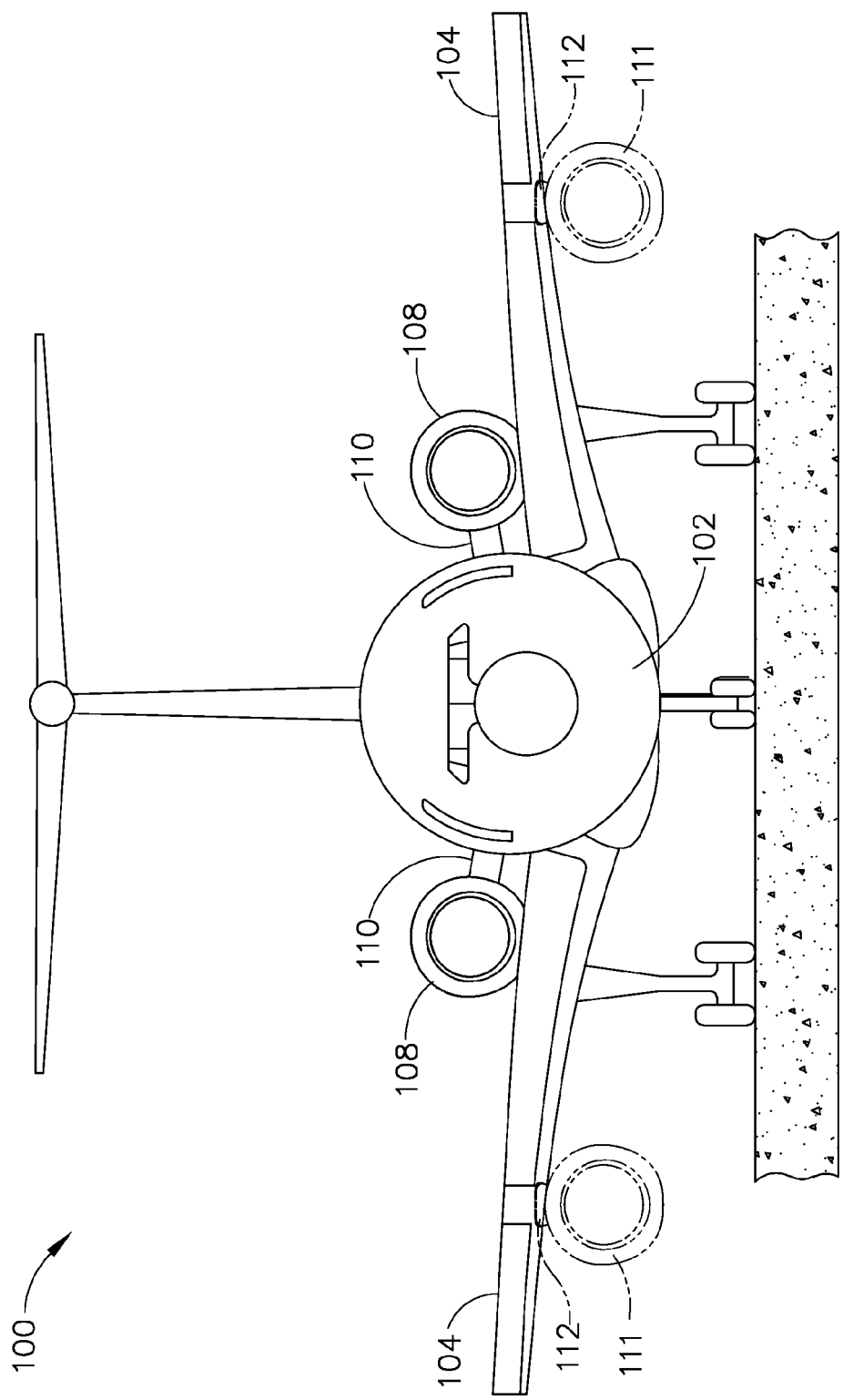
FIG. 1 is a schematic view of an aircraft.

FIG. 1 is a schematic view of an aircraft 100 including a fuselage 102 and a pair of wings 104. In one embodiment, aircraft 100 includes a pair of fuselage-mounted engine assemblies 108 coupled to, and extend outboard from, fuselage 102 via a pair of mounting structures, i.e., a pair of fuselage pylons 110. Wing-mounted engine assemblies 111 are suspended downward from wings 104 via a pair of mounting structures, i.e., a pair of wing pylons 112. Fuselage pylons 110 and wing pylons 112 may be coupled to fuselage 102 and wings 104, respectively, using any suitable coupling arrangement (e.g., a bolted arrangement). Wing-mounted engine assemblies 111 and fuselage-mounted engine assemblies 108 are substantially similar with the exception of mounting orientation.

Figure 2:
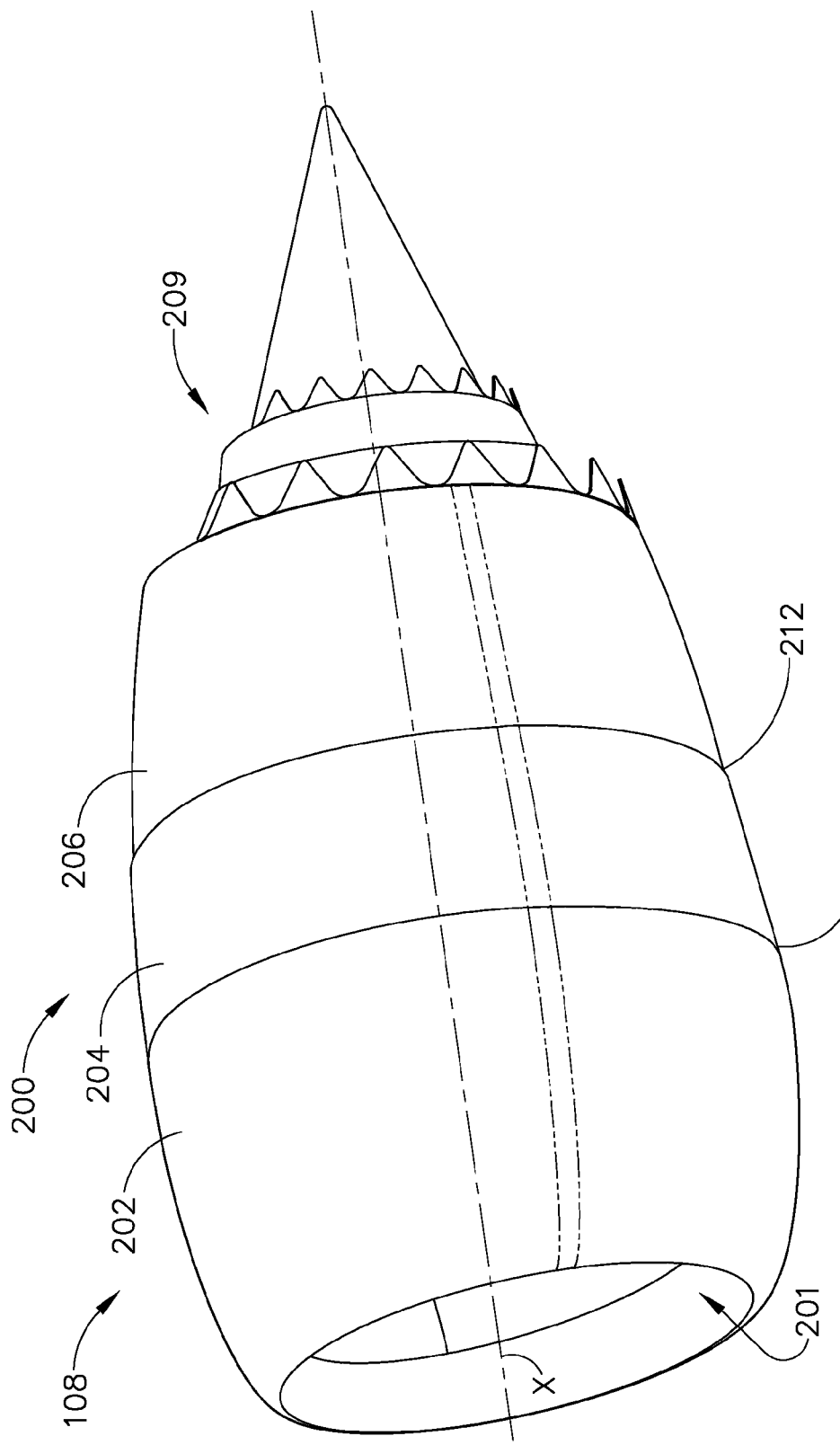
FIG. 2 is a perspective view of an exemplary fuselage-mounted engine assembly and nacelle for use on the aircraft shown in FIG. 1.

FIG. 2 is a perspective view of fuselage-mounted engine assembly 108 and a nacelle 200. In the exemplary embodiment, engine assembly 108 includes a generally annular nacelle 200 that is coupled about a gas turbine engine. Nacelle 200 includes an inlet 202, a fan cowl 204, and a translating cowl 206 (hereinafter referred to as a "transcowl"). Inlet 202 circumscribes an inlet end 201 of the engine and facilitates providing air to engine assembly 108. Inlet 202 is de-mountably coupled to an engine fan frame (not shown) and is considered part of the de-mountable power plant that is removed for infrequent repair and maintenance actions only.

Fan cowl 204 encloses an engine fan case (not shown) such that a first end 210 of fan cowl 204 abuts inlet 202 and such that a second end 212 of fan cowl 204 overlaps a portion of transcowl 206. Fan cowl 204 is configured to open to provide regular maintenance access to engine assembly 108 and fan case mounted accessories (not shown). Fan cowl 204 is supported from pylon 110 (shown in FIG. 1) (pylon 112 for wing-mounted engine assemblies 111). Alternatively, fan cowl 204 is coupled to a mounting structure, e.g., a mounting frame (not shown) that is coupled to pylon 110.

Translating cowl 206 circumscribes an exhaust end 209 of the engine, such that an engine axis X extends through a center of the engine from inlet end 201 through exhaust end 209. Translating cowl 206 is the external component of a thrust reverser (not shown) that generates reverse thrust when required. Alternatively, inlet 202, fan cowl 204, and/or transcowl 206 may have any suitable diameters and may be positioned relative to one another in any suitable manner that enables operation of nacelle 200 as described herein.

Figure 3:
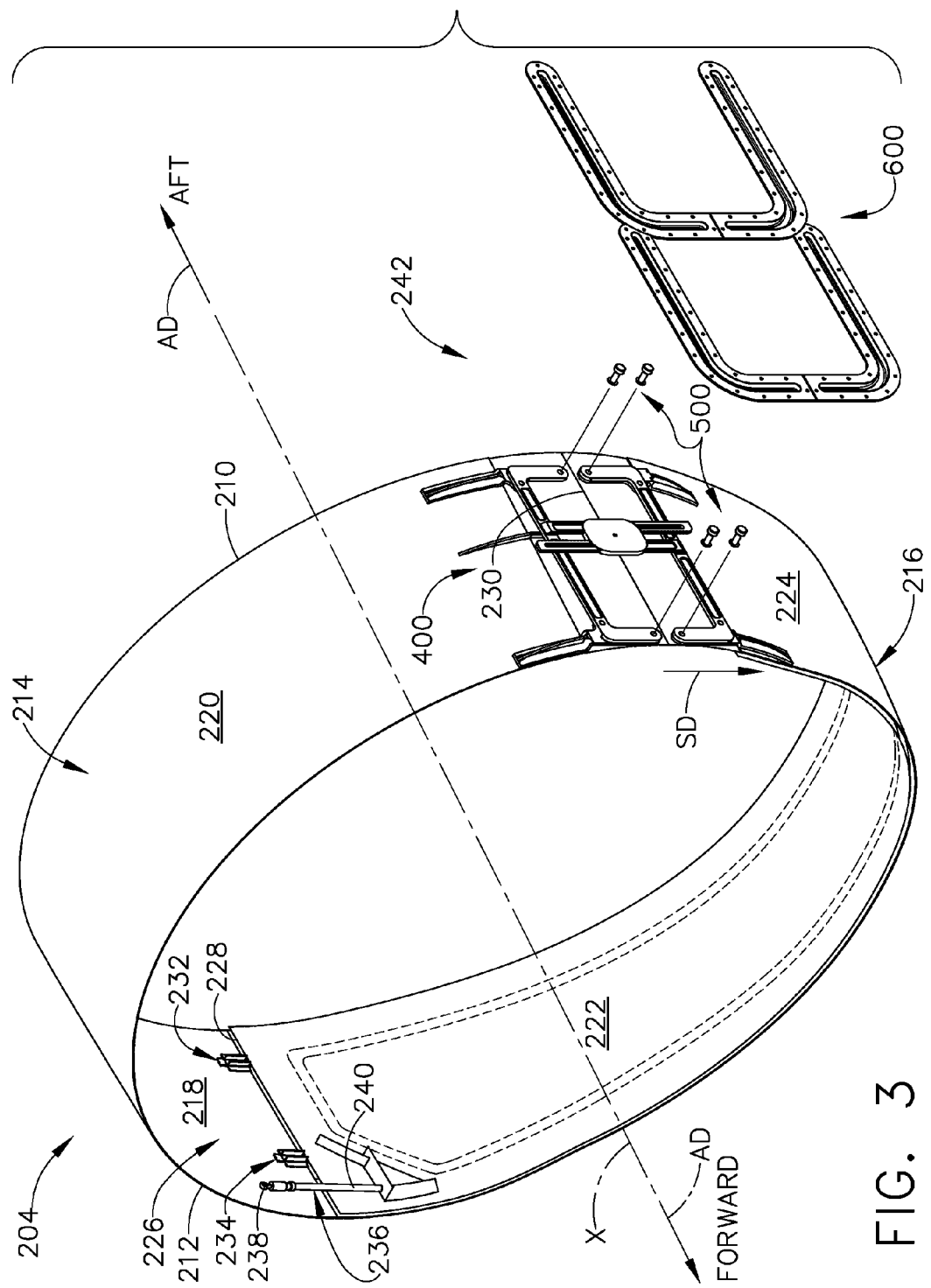
FIG. 3 is an exploded view of an exemplary mounting assembly for use in coupling the engine assembly shown in FIG. 2 to the fuselage of the aircraft shown in FIG. 1.

FIG. 3 is an exploded view of an exemplary mounting assembly 242 for use in coupling fan cowl 204 to fuselage pylons 110 and wing pylons 112 (shown in FIG. 1). In the exemplary embodiment, fan cowl 204 includes a first half 214 and a second half 216. First half 214 includes an inner surface 218 and an outer surface 220, and second half 216 includes an inner surface 222 and an outer surface 224. A locking assembly 226 joins first half 214 to second half 216 at a first joint 228, and mounting assembly 242 joins first half 214 to second half 216 at a second joint 230. Mounting assembly 242 includes a fan cowl sliding mechanism 400 slideably coupled within a guide track system 600 via a guide arrangement 500.

Locking assembly 226 includes at least one latch mechanism, e.g., a first latch 232, a second latch 234, and a limit stop 236. First latch 232 and second latch 234 are exposed on first half outer surface 220 and/or second half outer surface 224 such that first latch 232 and/or second latch 234 are openable by a user when first half 214 is coupled to second half 216. In the exemplary embodiment, a limit stop 236 is, for example, without limitation, a telescopic rod that includes a first end 238 coupled to first half inner surface 218 and a second end 240 coupled to second half inner surface 222 such that limit stop 236 spans first joint 228. Therefore, limit stop 236 defines the distance first half 214 and second half 216 are separable from each other. Alternatively, limit stop 236 may be any suitable stop mechanism that enables locking assembly 226 to function as described herein.

Figure 4:
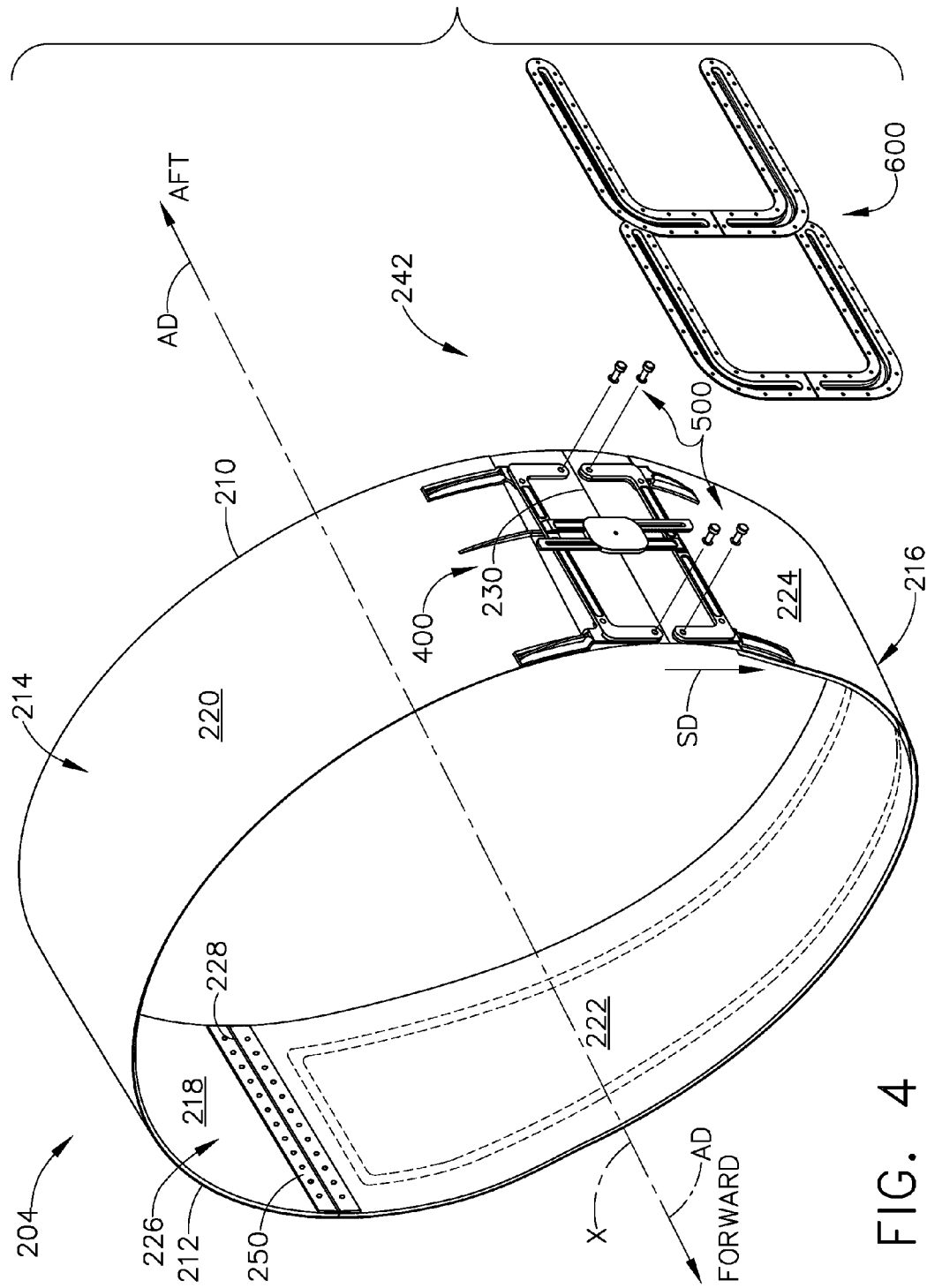
FIG. 4 is an exploded view of the mounting assembly shown in FIG. 3 and an exemplary axial hinge device coupled to an exemplary fan cowl that may be used with the engine assembly shown in FIG. 2.

FIG. 4 is an exploded view of mounting assembly 242 and an exemplary axial hinge device 250. In this alternative exemplary embodiment, first joint 228 is configured with an axial hinge device 250 coupled to both fan cowl halves 214 and 216. Axial hinge device 250 is one of continuous (shown) or non-continuous (not shown) that facilitates articulation of fan cowl halves 214 and 216 and facilitates sliding fan cowl halves 214 and 216 forward or aft as one component. This results in reduced operator effort and a lighter, less complex load transfer path between fan cowl halves 214 and 216. Axial hinge device 250 further facilitates rotation of fan cowl first half 214 and fan cowl second half 216 about axis X when first half 214 and second half 216 are separated by initial vertical movement of fan cowl sliding mechanism 400 within guide track system 600. Also, in this alternative exemplary embodiment, first latch 232, a second latch 234, and a limit stop 236 (all shown in FIG. 3) are removed.

Figure 5:
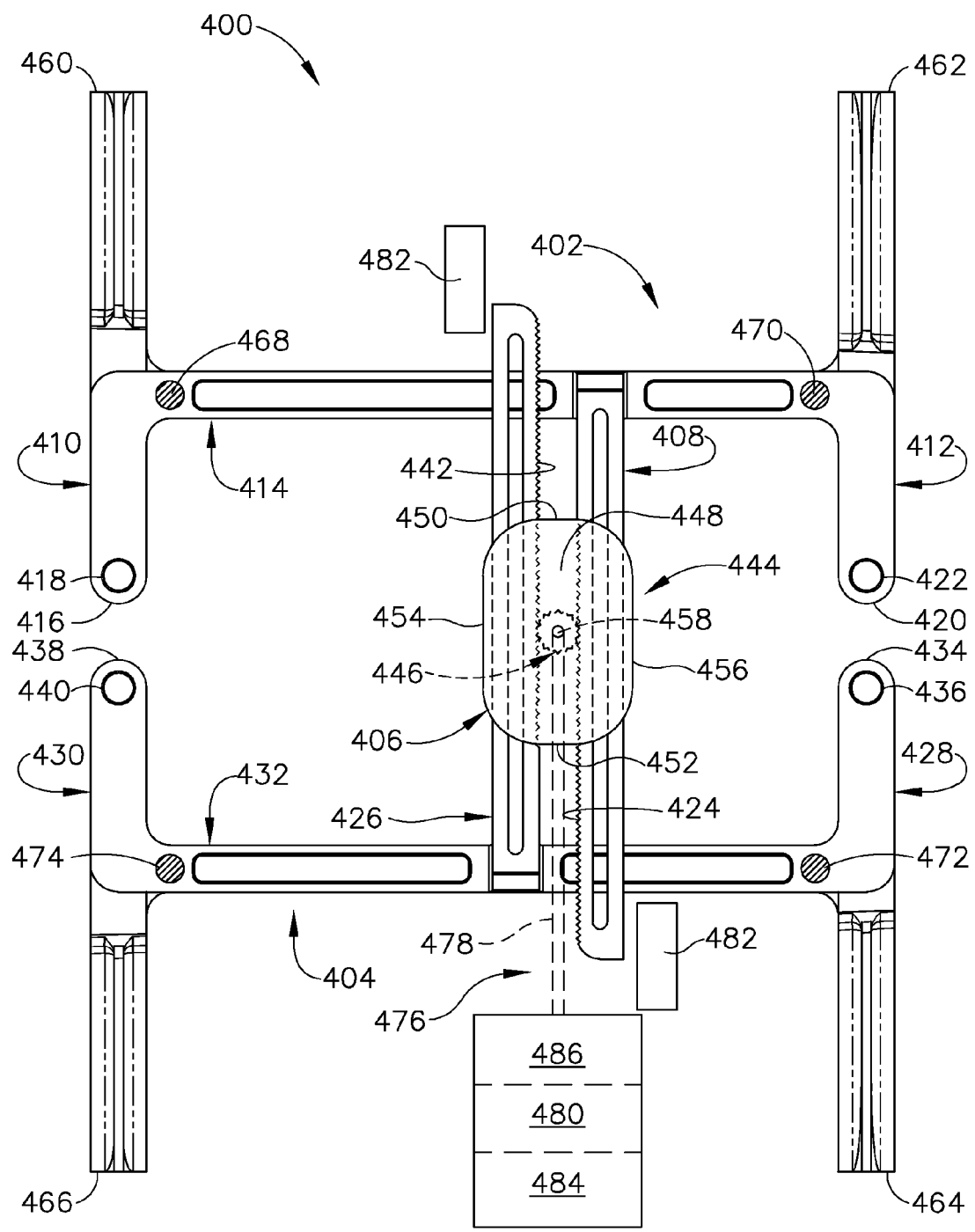
FIG. 5 is an enlarged side elevation view of a fan cowl sliding mechanism for use in the mounting assembly shown in FIG. 3.

FIG. 5 is an enlarged side elevation view of fan cowl sliding mechanism 400. Fan cowl sliding mechanism 400 includes an upper, i.e., a first connection member 402, a lower, i.e., a second connection member 404, a rate control device 406, a first mounting bracket 460, a second mounting bracket 462, a third mounting bracket 464, and a fourth mounting bracket 466. First connection member 402 is coupled to fan cowl first half 214 and second connection member 404 is coupled to fan cowl second half 216.

First connection member 402 includes a first vertical drive track 408, a first guide arm 410, a second guide arm 412, and a first support arm 414. First guide arm 410 is formed with, and extends substantially perpendicularly from, first support arm 414 to a first end 416 that defines a first guide slot 418. Second guide arm 412 is formed with, and extends substantially perpendicularly from, first support arm 414 to a second end 420 that defines a second guide slot 422. First vertical drive track 408 is formed with, and extends substantially perpendicularly from, first support arm 414 between first guide arm 410 and second guide arm 412, and first vertical drive track 408 defines a first gear rack 424. First connection member 402 is coupled to first mounting bracket 460 via a first fastener 468, e.g., without limitation, a bolt, and to second mounting bracket 462 via a second fastener 470, e.g., without limitation, a bolt. In one embodiment, first fastener 468 and second fastener 470 also couple first mounting bracket 460 and second mounting bracket 462, respectively, to fan cowl first half 214 (shown in FIG. 3). Alternatively, mounting brackets 460, 462 may be coupled to fan cowl first half 214 using any suitable fasteners that enable mounting assembly 242 to function as described herein.

Second connection member 404 includes a second vertical drive track 426, a third guide arm 428, a fourth guide arm 430, and a second support arm 432. Third guide arm 428 is formed with, and extends substantially perpendicularly from, second support arm 432 to a third end 434 that defines a third guide slot 436. Fourth guide arm 430 is formed with, and extends substantially perpendicularly from, second support arm 432 to a fourth end 438 that defines a fourth guide slot 440. Second vertical drive track 426 is formed with, and extends substantially perpendicularly from, second support arm 432 between third guide arm 428 and fourth guide arm 430, and second vertical drive track 426 defines a second gear rack 442 that opposes first gear rack 424. Second connection member 404 is coupled to third mounting bracket 464 via a third fastener 472, e.g., without limitation, a bolt, and to fourth mounting bracket 466 via a fourth fastener 474, e.g., without limitation, a bolt. In one embodiment, third fastener 472 and fourth fastener 474 also couple third mounting bracket 464 and fourth mounting bracket 466, respectively, to fan cowl second half 216 (shown in FIG. 3). Alternatively, mounting brackets 464, 466 may be coupled to fan cowl second half 216 using any suitable fasteners that enable mounting assembly 242 to function as described herein.

In the exemplary embodiment, vertical movement at fan cowl second half 216 with associated movement of second connection member 404 and second drive arm 426 will induce pinion drive gear 446 to rotate, thereby driving first vertical drive track 408 and first connection member 402 and moving fan cowl first half 214 vertically away from fan cowl second half 216. Such parting vertical movement apart of fan cowl first half 214 and fan cowl second half 216 may be limited by the length of vertical drive tracks 408 and 426, in addition to the length of limit stop device 236.

Rate control device 406 includes a housing 444 and a pinion drive gear 446 that engages first gear rack 424 and second gear rack 442. Housing 444 has an outer wall 448 that defines a first open end 450, a second open end 452, a first side 454, and a second side 456. Pinion drive gear 446 is mounted centrally within housing 444 and rotatably about a shaft 458 that extends through outer wall 448. In one embodiment, shaft 458 applies a counter-rotational force against pinion drive gear 446 (e.g., via a frictional engagement with pinion drive gear 446) to facilitate controlling a rotational speed of pinion drive gear 446. In other embodiments, pinion drive gear 446 may be mounted within housing 444 using any suitable mounting mechanism that enables rate control device 406 to function as described herein. First vertical drive track 408 extends through housing 444 from first open end 450 through second open end 452, and second vertical drive track 426 extends through housing 444 from second open end 452 through first open end 450. First side 454 and second side 456 facilitate aligning first vertical drive track 408 and second vertical drive track 426 such that first gear rack 424 and second gear rack 442 maintain a common driving engagement with pinion drive gear 446. First vertical drive track 408 and second vertical drive track 426 are linearly translatable through operation of pinion drive gear 446 against first gear rack 424 and second gear rack 442, respectively.

Also, in the exemplary embodiment, pinion drive gear 446 is coupled to a power drive system 476 to facilitate moving first half 214 and/or second half 216 relative to one another, as described herein. Power drive system 476 includes a drive shaft 478 coupled to shaft 458. Power drive system 476 also includes a power source 480 that includes one of electric drive devices, hydraulic drive devices, and pneumatic drive devices that include, without limitation, one of an electric motor, a hydraulic motor, and a pneumatic motor. In some embodiments, power source 480 includes rate control devices, e.g., without limitation, a variable speed electric motor and a mechanical fluid control device, e.g., without limitation, hydraulic/pneumatic flow control valves and orifice restrictions. Power drive system 476 further includes at least one drive arm position feedback device 482, e.g., without limitation, linear encoders. Alternatively, electric position sensors, such as, without exception, limit switches, may be coupled to fan cowl first half 214 and/or fan cowl second half 216 to facilitate annunciating that fan cowl 204 is at least partially open, deployed forward, or deployed aft.

Power drive system 476 also includes a controller 484. Controller 484 is coupled to, and controls an operation of, power source 480. In the exemplary embodiment, controller 484 is implemented by at least one processor. As used herein, the processor includes any suitable programmable circuit such as, without limitation, one or more systems and microcontrollers, microprocessors, a general purpose central processing unit (CPU), reduced instruction set circuits (RISC), application specific integrated circuits (ASIC), programmable logic circuits (PLC), field programmable gate arrays (FPGA), and/or any other circuit capable of executing the functions described herein. The above examples are exemplary only, and thus are not intended to limit in any way the definition and/or meaning of the term "processor."

In addition, controller 484 includes at least one memory device (not shown) coupled to the processor that stores computer-executable instructions and data, such as operating data, parameters, setpoints, threshold values, and/or any other data that enables power drive system 476 to function as described herein. The memory device may include one or more tangible, non-transitory, computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory.

The methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, such as a firmware, physical and virtual storage, CD-ROMs, DVDs and another digital source such as a network or the Internet, as well as yet to be developed digital means, with the sole exception being a transitory, propagating signal.

Alternatively, power drive system 476 may be coupled to a portion of first half 214 and/or second half 216 of fan cowl 204 through any device, including, without limitation, limit stop 236. In such embodiments, power source 480 replaces manual operation of separating first half 214 from second half 216 and provides a mechanism for rate control.

Also, alternatively, power drive system 476 includes a rate control device that is a clutch device 486 that is any clutch-type mechanism that enables operation of power drive system 476 as described herein including, without limitation, a pressure plate clutch, a magnetic clutch, and a hydraulic clutch.

Power source 480, controller 484, and clutch device 486 may be located anywhere on aircraft 100 or remotely from aircraft 100 to facilitate adjusting fan cowl 204 as described herein. For example, and without limitation, power drive system 476 is coupled to fan cowl 204 at, or proximate to, fan cowl second end 212 to facilitate moving fan cowl 204 relative to transcowl 206, as described herein. Alternatively, power drive system 476 is positioned in transcowl 206 or wing pylon 110. In some embodiments, all, or portions of, a transcowl translation system (not shown) perform the functions of power drive system 476 or those functions supplemented with power drive system 476.

Figure 6:
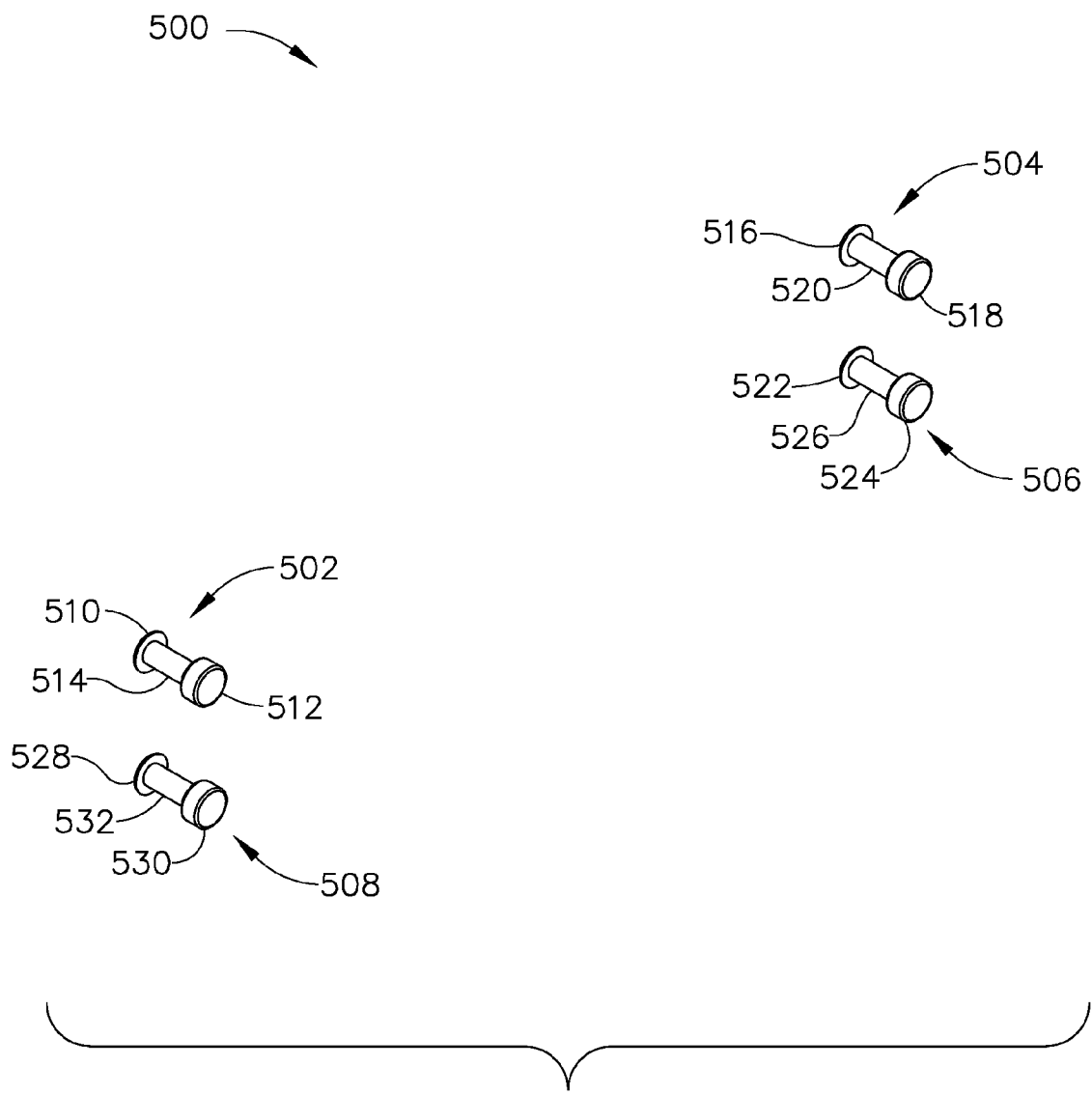
FIG. 6 is an enlarged perspective view of a guide arrangement for use in the mounting assembly shown in FIG. 3.
Figure 7:
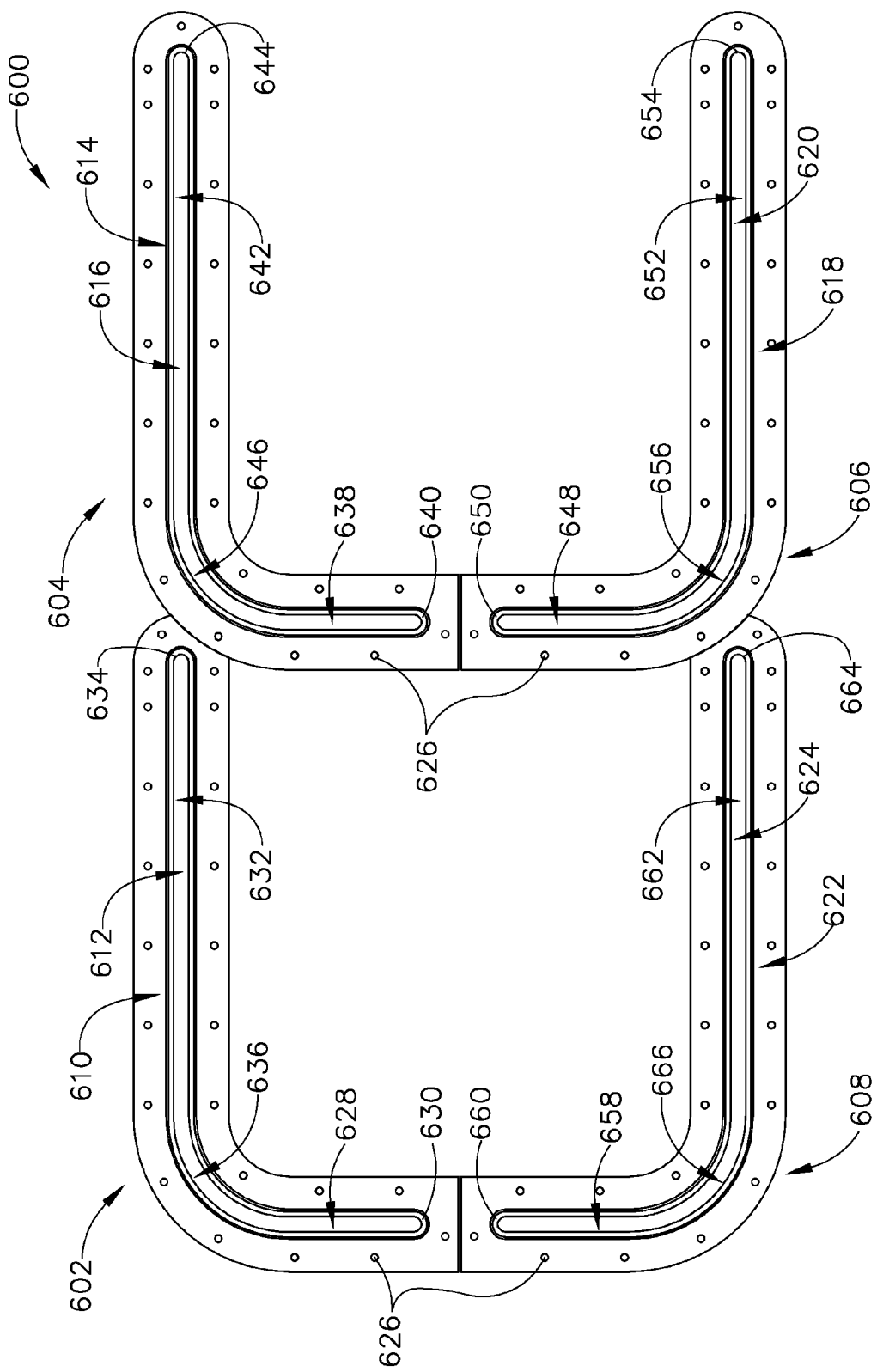
FIG. 7 is an enlarged side elevation view of a track arrangement for use in the mounting assembly shown in FIG. 3.

FIG. 6 is an enlarged perspective view of an exemplary guide arrangement 500. In the exemplary embodiment, guide arrangement 500 includes a first guide 502, a second guide 504, a third guide 506, and a fourth guide 508. First guide 502 includes a first base 510, a first head 512, and a first neck 514 extending between first base 510 and first head 512. Second guide 504 includes a second base 516, a second head 518, and a second neck 520 extending between second base 516 and second head 518. Third guide 506 includes a third base 522, a third head 524, and a third neck 526 extending between third base 522 and third head 524. Fourth guide 508 includes a fourth base 528, a fourth head 530, and a fourth neck 532 extending between fourth base 528 and fourth head 530. Alternatively, guide arrangement 500 may include any number of guides having any suitable shape that enables mounting assembly 242 to function as described herein.

FIG. 6 is an enlarged side elevation view of an exemplary guide track system 600. In the exemplary embodiment, guide track system 600 includes a first track 602, a second track 604, a third track 606, and a fourth track 608. First track 602 defines a first channel 610 having a first slit 612, and second track 604 defines a second channel 614 having a second slit 616. Third track 606 defines a third channel 618 having a third slit 620, and fourth track 608 defines a fourth channel 622 having a fourth slit 624. Each track 602, 604, 606, 608 includes a plurality of fastener holes 626 to facilitate coupling guide track system 600 to fuselage pylon 110. First slit 612 has a first aftward portion 628 defining a first aftward end 630, a first forward portion 632 defining a first forward end 634, and a first bend 636 extending between first aftward portion 628 and first forward portion 632. Second slit 616 has a second aftward portion 638 defining a second aftward end 640, a second forward portion 642 defining a second forward end 644, and a second bend 646 extending between second aftward portion 638 and second forward portion 642. Third slit 620 has a third aftward portion 648 defining a third aftward end 650, a third forward portion 652 defining a third forward end 654, and a third bend 656 extending between third aftward portion 648 and third forward portion 652. Fourth slit 624 has a fourth aftward portion 658 defining a fourth aftward end 660, a fourth forward portion 662 defining a fourth forward end 664, and a fourth bend 666 extending between fourth aftward portion 658 and fourth forward portion 662. In the exemplary embodiment, guide track system 600 is oriented such that first forward portion 632 is aligned with second forward portion 642 and such that third forward portion 652 is aligned with fourth forward portion 662. Alternatively, guide track system 600 may have any orientation that enables mounting assembly 242 to function as described herein.

Referring to FIGS. 3, 4, 5, 6, and 7, in operation, first track 602 is coupled to first connection member 402 via first guide 502 such that first head 512 is positioned within first channel 610, first neck 514 extends through first slit 612 and first guide slot 418, and first base 510 is positioned between first connection member 402 and fan cowl 204. Second track 604 is coupled to first connection member 402 via second guide 504 such that second head 518 is positioned within second channel 614, second neck 520 extends through second slit 616 and second guide slot 422, and second base 516 is positioned between first connection member 402 and fan cowl 204. Third track 606 is coupled to second connection member 404 via third guide 506 such that third head 524 is positioned within third channel 618, third neck 526 extends through third slit 620 and third guide slot 436, and third base 522 is positioned between second connection member 404 and fan cowl 204. Fourth track 608 is coupled to second connection member 404 via fourth guide 508 such that fourth head 530 is positioned within fourth channel 622, fourth neck 532 extends through fourth slit 624 and fourth guide slot 440, and fourth base 528 is positioned between second connection member 404 and fan cowl 204. With first head 512, second head 518, third head 524, and fourth head 530 positioned within first channel 610, second channel 614, third channel 618, and fourth channel 622, respectively, nacelle 200 is mounted on fuselage 102 by coupling guide track system 600 to fuselage pylon 110 using any suitable fasteners (e.g., bolts) that extend through fastener holes 626 and engage fuselage pylon 110. When fan cowl 204 is closed (i.e., when fan cowl first half 214 and fan cowl second half 216 are fastened together via first latch 232 and/or second latch 234), first guide 502 is seated adjacent first aftward end 630, second guide 504 is seated adjacent second aftward end 640, third guide 506 is seated adjacent third aftward end 650, and fourth guide 508 is seated adjacent fourth aftward end 660.

Also, in operation, to open fan cowl 204, a user may unlock first latch 232 and/or second latch 234. When first latch 232 and/or second latch 234 is unlocked, a force may be applied to fan cowl second half 216 in a separating direction SD (shown in FIG. 3) (e.g., a manual force applied by a user, a gravitational force, and/or a force applied by power drive system 476 to facilitate moving fan cowl second half 216 away from engine axis X. As fan cowl second half 216 moves away from engine axis X, second vertical drive track 426 drives pinion drive gear 446 into rotation via second gear rack 442 such that the rotation of pinion drive gear 446 drives fan cowl first half 214 away from engine axis X via first gear rack 424. In one embodiment, shaft 458 controls (i.e., slows) the rotation of pinion drive gear 446 such that fan cowl second half 216 and fan cowl first half 214 move away from engine axis X (i.e., move away from one another) at a predetermined rate. In some embodiments, the rate of rotation of drive gear 446 is controlled by one of power source 480, controller 484, and clutch device 486.

As fan cowl second half 216 and fan cowl first half 214 move away from engine axis X, first guide 502, second guide 504, third guide 506, and fourth guide 508 move along first channel 610, second channel 614, third channel 618, and fourth channel 622, respectively. Specifically, first guide 502, second guide 504, third guide 506, and fourth guide 508 move simultaneously in the following manner: first guide 502 moves from first aftward end 630, along first aftward portion 628, and partially across first bend 636; second guide 504 moves from second aftward end 640, along second aftward portion 638, and partially across second bend 646; third guide 506 moves from third aftward end 650, along third aftward portion 648, and partially across third bend 656; and fourth guide 508 moves from fourth aftward end 660, along fourth aftward portion 658, and partially across fourth bend 666, such that fan cowl first half 214 and fan cowl second half 216 move away from engine axis X toward a predetermined maximum distance of separation, as controlled by limit stop 236.

Such vertical movement of fan cowl first half 214 and fan cowl second half 216 facilitates fan cowl halves 214 and 216 being slid forward or aft horizontally along axial engine axis X in an aft axial direction AD or a forward axial direction AD as required by the specific installation with guide stops 500 moving horizontally parallel to axial engine axis X within pylon mounted guide track system 600. Specifically, when fan cowl first half 214 and fan cowl second half 216 have moved away from one another a distance, fan cowl first half 214 and fan cowl second half 216 begin to move over inlet 202 and toward inlet end 201. Specifically, first guide 502, second guide 504, third guide 506, and fourth guide 508 move simultaneously in the following manner: first guide 502 moves completely across first bend 636, along first forward portion 632, and into engagement with first forward end 634; second guide 504 moves completely across second bend 646, along second forward portion 642, and into engagement with second forward end 644; third guide 506 moves completely across third bend 656, along third forward portion 652, and into engagement with third forward end 654; and fourth guide 508 moves completely across fourth bend 666, along fourth forward portion 662, and into engagement with fourth forward end 664. When first guide 502, second guide 504, third guide 506, and/or fourth guide 508 engage first forward end 634, second forward end 644, third forward end 654, and fourth forward end 664, respectively, fan cowl first half 214 and fan cowl second half 216 stop moving toward inlet end 201, and fan cowl 204 remains in an open position such that a portion of the engine is accessible to a user (e.g., to maintenance the engine).

The horizontal movement of fan cowl halves 214 and 216 exposes the engine fan case and its mounted accessories and sub-components for maintenance. This horizontal movement by be limited by the horizontal length of the pylon mounted guide track system 600 and may increase full movement or multiple intermediate movement positions determined by the use of limit pin and mating holes in the track arrangement.

To close fan cowl 204, a force may be applied to either fan cowl first half 214 and/or fan cowl second half 216 in an axial direction AD (shown in FIG. 3) (e.g., a manual force applied by a user and/or a force applied by a motor located on or remotely from aircraft 100) such that fan cowl first half 214 and fan cowl second half 216 move toward exhaust end 209. Specifically, first guide 502, second guide 504, third guide 506, and fourth guide 508 simultaneously move in the following manner: first guide 502 moves along first channel 610 from first forward end 634 toward first aftward end 630; second guide 504 moves along second channel 614 from second forward end 644 toward second aftward end 640; third guide 506 moves along third channel 618 from third forward end 654 toward third aftward end 650; and fourth guide 508 moves along fourth channel 622 from fourth forward end 664 toward fourth aftward end 660. When first guide 502, second guide 504, third guide 506, and fourth guide 508 are adjacent first aftward end 630, second aftward end 640, third aftward end 650, and fourth aftward end 660, respectively, fan cowl first half 214 and fan cowl second half 216 engage one another at first joint 228 and second joint 230 (i.e., fan cowl 204 closes). Once fan cowl 204 is closed, a user may lock first latch 232 and/or second latch 234 to fasten fan cowl first half 214 to fan cowl second half 216 to facilitate restricting access to the engine through fan cowl 204.

Figure 8:
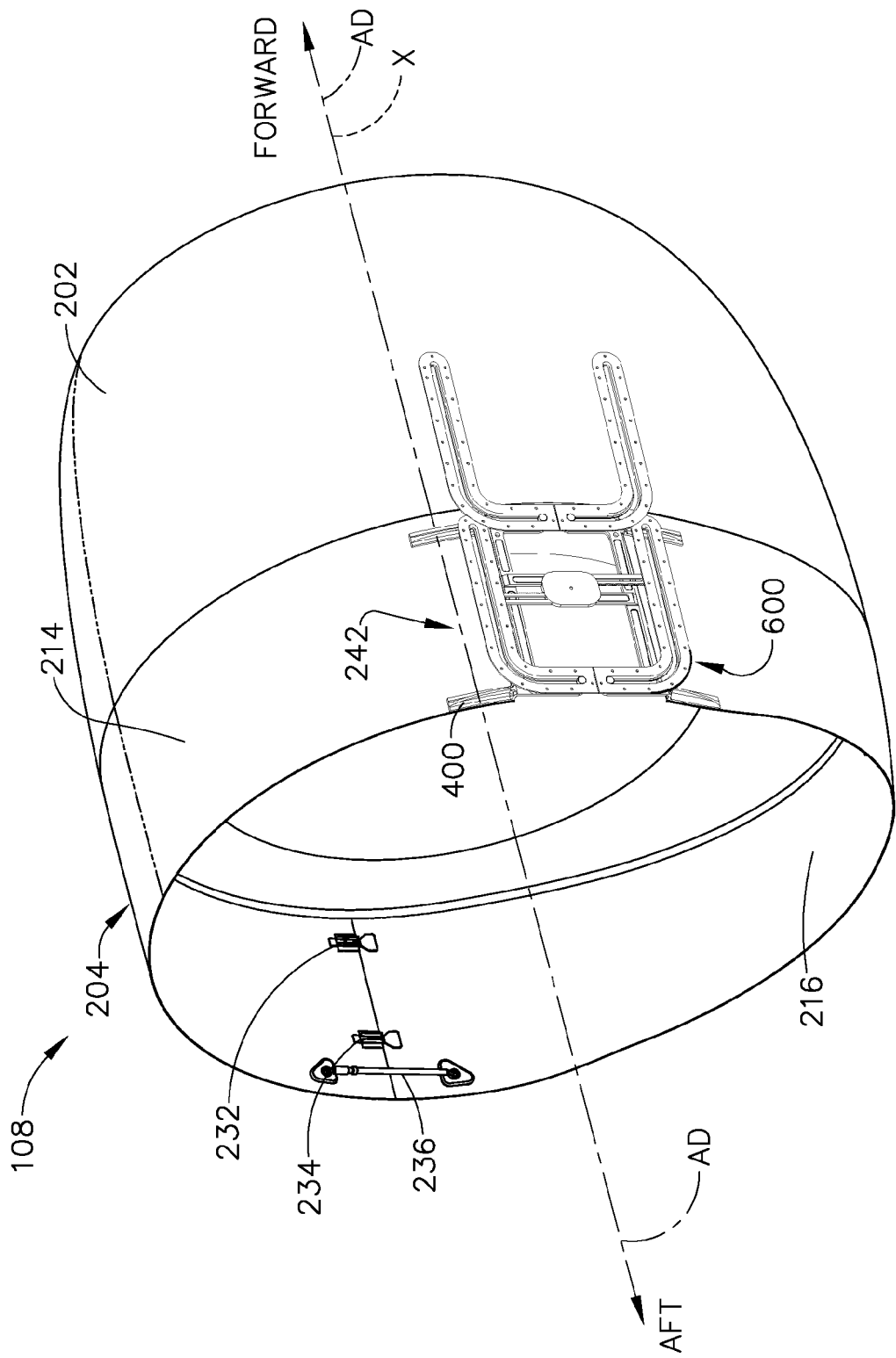
FIG. 8 is a perspective view of the fuselage-mounted engine assembly shown in FIG. 2 with the exemplary fan cowl in the closed position.

FIG. 8 is a perspective view of fuselage-mounted engine assembly 108 with fan cowl 204 in the closed position, i.e., fan cowl first half 214 is coupled to fan cowl second half 216. FIG. 9 is a perspective view of fuselage-mounted engine assembly 108 with fan cowl 204 in the open position, i.e., fan cowl first half 214 is separated from fan cowl second half 216. FIG. 10 is a perspective view of fuselage-mounted engine assembly 108 with fan cowl 204 in the open and forward position, i.e., fan cowl first half 214 is separated from fan cowl second half 216 and both halves 214 and 216 are shifted to the forward position to at least partially cover inlet 202. Alternatively, fan cowl first half 214 and fan cowl second half 216 are shifted aftward to at least partially cover transcowl 206 (shown in FIG. 2).

In operation, to open fan cowl 204, a user may unlock first latch 232 and/or second latch 234. When first latch 232 and/or second latch 234 is unlocked, a force may be applied to fan cowl second half 216 in a separating direction SD (shown in FIG. 3), e.g., a manual force applied by a user, a gravitational force, and/or a force applied by power drive system 476 (shown in FIG. 5) to facilitate moving fan cowl second half 216 away from engine axis X. As fan cowl second half 216 moves away from engine axis X, fan cowl sliding mechanism 400 drives fan cowl first half 214 away from engine axis X.

As fan cowl second half 216 and fan cowl first half 214 move away from engine axis X, first guide 502, second guide 504, third guide 506, and fourth guide 508 (all shown in FIG. 6) move along their respective channels (shown in FIG. 7) in track guide system 600 as described above. Fan cowl first half 214 and fan cowl second half 216 move away from engine axis X toward a predetermined maximum distance of separation, as controlled by limit stop 236.

Such vertical movement of fan cowl first half 214 and fan cowl second half 216 facilitates fan cowl halves 214 and 216 being slid forward or aft horizontally along axial engine axis X in an aft axial direction AD or a forward axial direction AD as required by the specific installation with guide stops 500 (shown in FIG. 6) moving horizontally parallel to axial engine axis X within pylon mounted guide track system 600. Specifically, when fan cowl first half 214 and fan cowl second half 216 have moved away from one another a distance, fan cowl first half 214 and fan cowl second half 216 begin to move over inlet 202 and toward inlet end 201 (shown in FIG. 2). Fan cowl first half 214 and fan cowl second half 216 stop moving toward inlet end 201, and fan cowl 204 remains in an open position such that a portion of the engine is accessible to a user, e.g., to inspect and maintain the engine.

The horizontal movement of fan cowl halves 214 and 216 exposes the engine fan case and its mounted accessories and sub-components for maintenance. This horizontal movement by be limited by the horizontal length of the pylon mounted guide track system 600 and may increase full movement or multiple intermediate movement positions determined by the use of limit pin and mating holes in the track arrangement.

The embodiments described in FIGS. 2 through 10 are associated with a typical aircraft fuselage-mounted fan cowl 204 mounted to aircraft 100 via pylon 110. In some embodiments, similar effective fan cowl 204 opening by sliding fan cowl halves 214 and 216 of an aircraft wing mounted assembly 111 mounted to aircraft 100 via wing pylon 112 may be achieved by mounting assembly 242 under pylon 112 or supporting mounting assembly 242 from the engine case. Rather than vertical separation of fan cowl first half 214 and fan cowl second half 216 as described above for a fuselage-mounted fan cowl, a wing-mounted fan cowl uses horizontal separation of fan cowl first half 214 and fan cowl second half 216 to open fan cowl 204.

Figure 11:
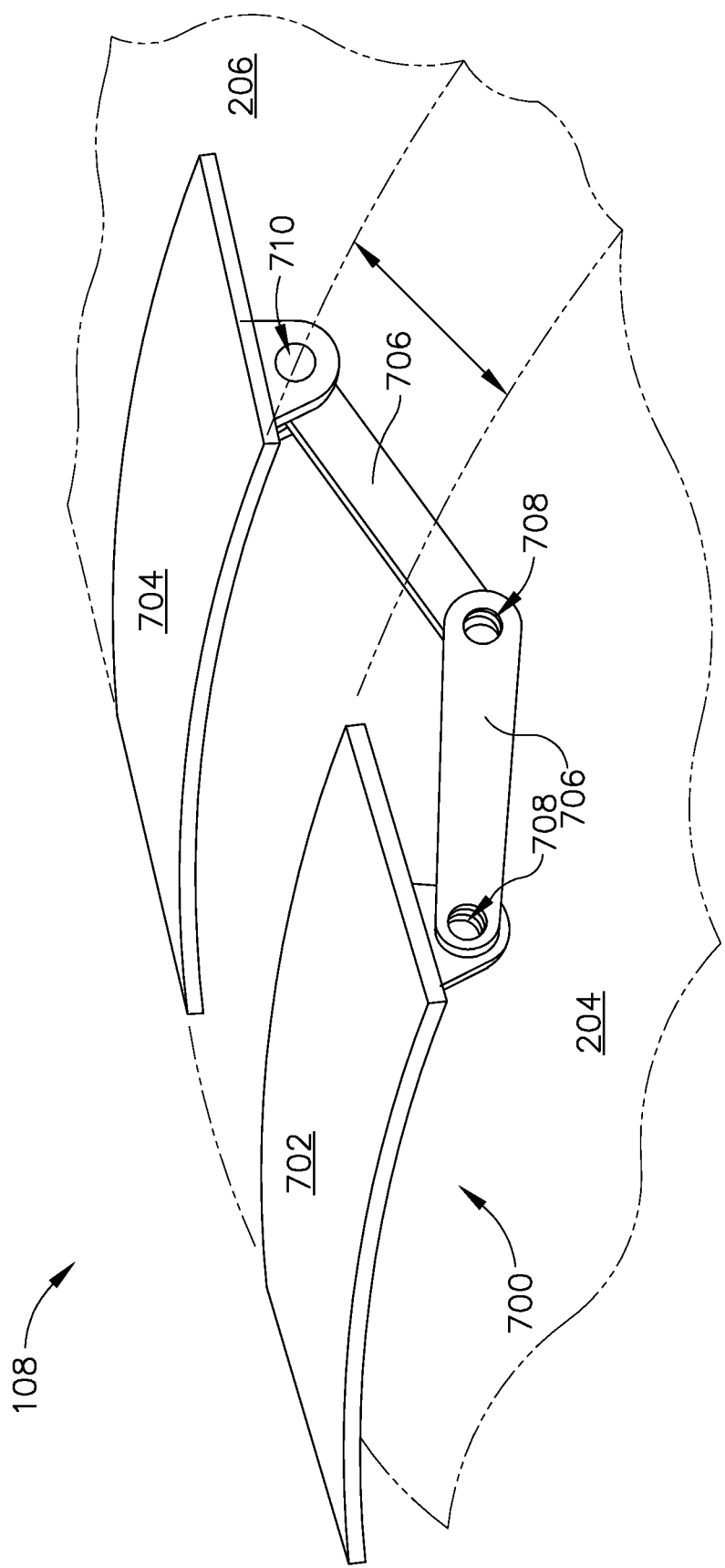
FIG. 11 is a perspective view of the fuselage-mounted engine assembly shown in FIG. 2 with an exemplary fan cowl-to-transcowl linkage device in a first position.
Figure 12:
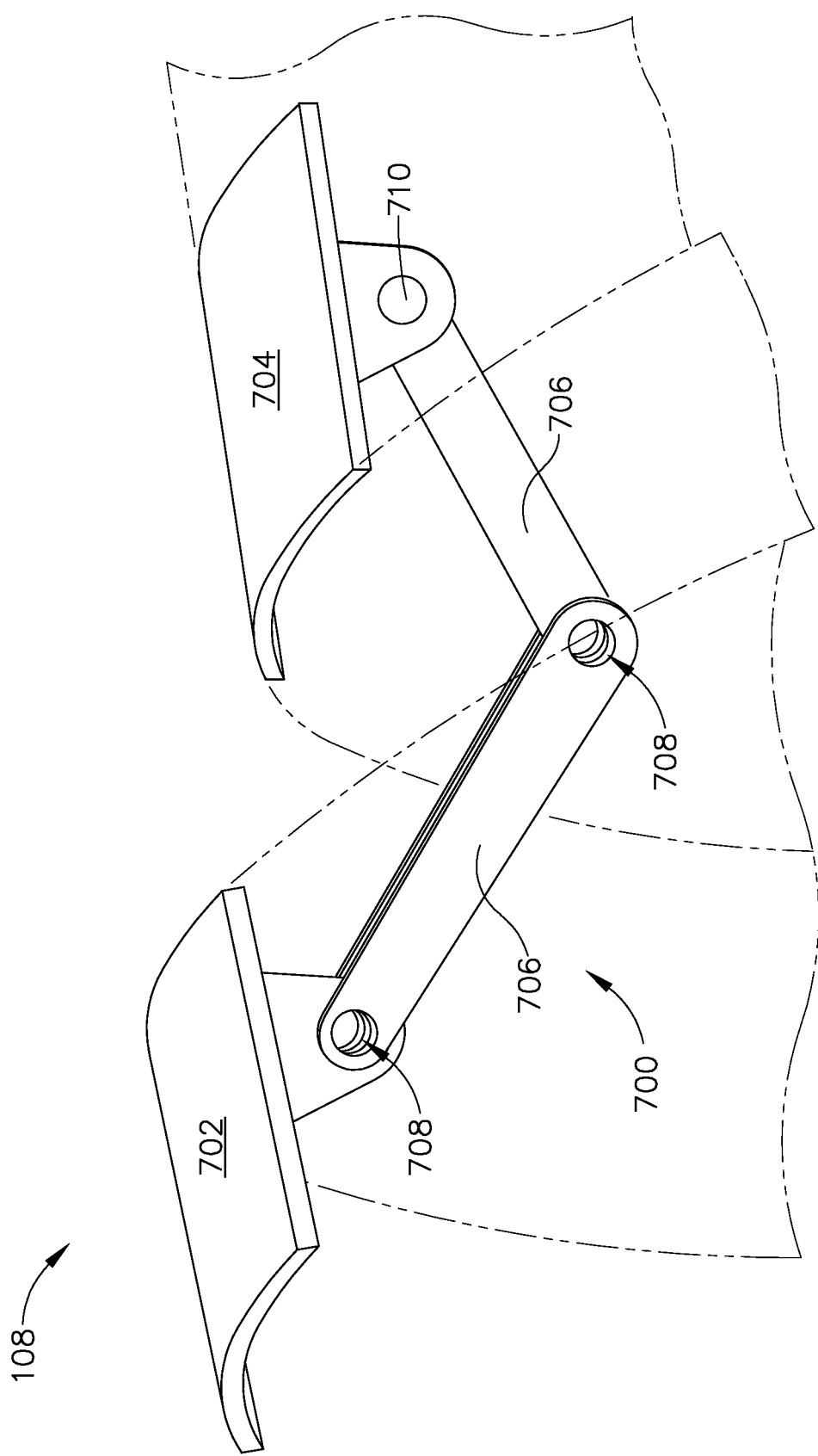
FIG. 12 is a perspective view of the fan cowl-to-transcowl linkage device shown in FIG. 11 in a second position.

FIG. 11 is a perspective view of fuselage-mounted engine assembly 108 with an exemplary fan cowl-to-transcowl linkage device 700 in a first position, i.e., when fan cowl 204 and transcowl 206 are axial separated. FIG. 12 is a perspective view of fan cowl-to-transcowl linkage device 700 in a second position, i.e., when fan cowl 204 is elevated with respect to transcowl 206. In the exemplary embodiment, fan cowl 204 is coupled to transcowl 206 via at least one fan cowl-to-transcowl linkage device 700.

Linkage device 700 facilitates transmission of power generated by power drive system 476 (shown in FIG. 5) to fan cowl 204 to pull fan cowl 204 aftward with aftward movement of transcowl 206. In some embodiments, as described above, power drive system 486 is positioned in transcowl 206 fuselage pylon 110. In some embodiments, all, or portions of, a transcowl translation system (not shown) perform the functions of power drive system 476 or those functions supplemented with power drive system 476.

In the exemplary embodiment, linkage device 700 includes a fan cowl linkage plate 702 that is coupled to fan cowl 204 via any method that enables operation of linkage device 700 as described herein, including, without limitation, fastening hardware and welding. Similarly, linkage device 700 includes a transcowl linkage plate 704 that is coupled to transcowl 206 via any method that enables operation of linkage device 700 as described herein, including, without limitation, fastening hardware and welding. Both linkage plates 702 and 704 are curved to be complimentary with fan cowl 204 and transcowl 206, respectively.

Also, in the exemplary embodiment, linkage device 700 includes a plurality of linkage arms 706 coupled to each other and linkage plates 702 and 704 via pivot points 708 that receive pivot pins 710 (only one shown in FIGS. 11 and 12). Linkage plates 702 and 704, linkage arms 706, and pivot pins 710 have any dimensions and are made of any materials that enable operation of linkage device 700 as described herein. Any number of linkage devices 700 that enables operation of fuselage-mounted engine assembly 108 is used.

For those embodiments that use linkage device 700 to move fan cowl 204 and transcowl 206 forward or aft in unison, mounting assembly 242 is either removed or disabled by, for example, and without limitation, removing guides 502, 504, 506, and 508 (shown in FIG. 6) from their respective guide tracks 602, 604, 606, and 608.

As will be appreciated by one skilled in the art and based on the foregoing specification, the above-described embodiments of the invention may be implemented using computer programming or engineering techniques including computer software, firmware, hardware, or any combination or subset thereof, wherein one technical effect is to facilitate adjusting a cowl. Any resulting program, having computer-readable code means, may be embodied or provided within one or more computer-readable media, thereby making a computer program product, i.e., an article of manufacture, according to the discussed embodiments of the invention. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, and/or by transmitting the code over a network.

The nacelle described herein enables a cowl to be adjusted in a manner that facilitates reducing wind loads on the cowl when the cowl is in an open position. The nacelle described herein further enables providing a cowl that has a reduced weight to facilitate decreasing an overall weight of the engine assembly and increasing engine efficiency by reducing fuel consumption of the engine.

Exemplary embodiments of a nacelle and a method of assembling the same are described above in detail. The nacelle is not limited to the specific embodiments described herein, but rather, components of the nacelle may be utilized independently and separately from other components described herein. For example, the cowl described herein may have other industrial and/or consumer applications and is not limited to practice with a nacelle for a gas turbine engine as described herein. Rather, the cowl can be implemented and utilized in connection with many other industries.

While the invention has been described in terms of various specific embodiments, those skilled in the art will recognize that the invention can be practiced with modification within the spirit and scope of the claims.

What is claimed is:

1. A nacelle for housing an engine that includes an inlet end, an exhaust end, and an axis extending through the engine from the inlet end through the exhaust end, said nacelle comprising a fan cowl sized to cover at least a first axial portion of the engine, said fan cowl coupled to an engine mounting pylon via a mounting assembly, said fan cowl comprising a first half and a second half coupled together about the engine in a first position having a first perimeter, said halves adapted to be vertically moveable in opposing directions to a second position having a second perimeter greater than the first perimeter, and said fan cowl movable with respect to the engine along the axis toward at least one of the inlet end and the exhaust end when said halves are in the second position.

2. The nacelle in accordance with claim 1, wherein the mounting assembly includes at least one power drive system comprising at least one drive shaft coupled to a translatable portion of said mounting assembly.

3. The nacelle in accordance with claim 2, wherein said power drive system comprises at least one power source comprising at least one of an electric motor, a hydraulic motor, or a pneumatic motor.

4. The nacelle in accordance with claim 1, wherein said mounting assembly further comprising at least one integral rate control device configured to control a rate at which said first half and said second half are vertically moveable relative to one another.

5. The nacelle in accordance with claim 4, wherein said at least one integral rate control device comprises a clutch device.

6. The nacelle in accordance with claim 1 further comprising a transcowl circumscribing at least a second axial portion of the engine, said fan cowl extending from forward of said transcowl to an overlapping relationship with said transcowl, said transcowl movable with respect to the engine along the axis toward at least one of the inlet end and the exhaust end, wherein said fan cowl is coupled to said transcowl via at least one linkage device that is at least one of removable or separable, and axial movement of said transcowl drives axial movement of said fan cowl to expose the first axial portion of the engine.

7. The nacelle in accordance with claim 6, wherein said at least one linkage device comprises at least one of a connecting rod and a connecting cable that facilitates transmission of power from said transcowl to said fan cowl.

8. The nacelle in accordance with claim 1, wherein said mounting assembly further comprising a limit stop between said first half and said second half configured to define the distance that said first half and said second half are separable from each other.

9. The nacelle in accordance with claim 1, wherein said at least one power drive system comprises at least one position feedback device.

10. A nacelle for housing an engine that includes an inlet end, an exhaust end, and an axis extending through the engine from the inlet end through the exhaust end, said nacelle comprising a fan cowl, that comprises a first half and a second half coupled together about the engine in an arrangement having a first diameter, sized to cover at least a first axial portion of the engine, said fan cowl coupled to a mounting structure via a mounting assembly comprising a fan cowl sliding mechanism coupled to said fan cowl and a guide track coupled to said mounting structure, said fan cowl halves are vertically separable along said guide track to a modified arrangement having a second diameter greater than the first diameter, and in the modified arrangement said fan cowl is slideable along said guide track such that said fan cowl is movable with respect to the engine along the axis toward at least one of the inlet end and the exhaust end.

11. The nacelle in accordance with claim 10, wherein said mounting structure is an aircraft fuselage pylon, said fan cowl is mounted to said aircraft fuselage pylon via said fan cowl sliding mechanism and said guide track.

12. The nacelle in accordance with claim 10, wherein said mounting structure is an aircraft wing pylon, said fan cowl is mounted to said aircraft wing pylon via said fan cowl sliding mechanism and said guide track.

13. The nacelle in accordance with claim 10, wherein said fan cowl sliding mechanism is coupled to said guide track via at least one guide positioned within said guide track.

14. The nacelle in accordance with claim 10, wherein the vertical separation and axial movement of said fan cowl halves are defined by a length of said guide track.

15. The nacelle in accordance with claim 10, wherein said first half of said fan cowl and said second half of said fan cowl are coupled together via at least one latch mechanism.

16. The nacelle in accordance with claim 10, wherein said first half of said fan cowl and said second half of said fan cowl define an outboard joint therebetween, wherein said first half of said fan cowl and said second half of said fan cowl are coupled together at said outboard joint.

17. The nacelle in accordance with claim 10 further comprising an axial hinge coupled to said fan cowl, said axial hinge facilitates axial sliding of said fan cowl with said first half and said second half vertically separated to the modified arrangement.

18. The nacelle in accordance with claim 17, wherein said first half and said second half of said fan cowl define an inboard joint therebetween, said axial hinge further facilitates rotation of said first half and said second half of said fan cowl about the axis when said first half and said second half of said fan cowl are vertically separated to the modified arrangement.

19. The nacelle in accordance with claim 17, wherein said axial hinge is continuous.

\* \* \* \* \*

UNITED STATES PATENT AND TRADEMARK OFFICE
CERTIFICATE OF CORRECTION

PATENT NO. : 9,188,025 B2
APPLICATION NO. : 13/524036
DATED : November 17, 2015
INVENTOR(S) : Calder et al.

It is certified that error appears in the above-identified patent and that said Letters Patent is hereby corrected as shown below:

IN THE SPECIFICATION

In Column 10, Line 30, delete "drive system 486" and insert -- drive system 476 --, therefor.

Signed and Sealed this
Twenty-ninth Day of March, 2016

Michelle K. Lee
*Director of the United States Patent and Trademark Office*